(12) United States Patent
Stevens

(10) Patent No.: US 9,142,107 B2
(45) Date of Patent: *Sep. 22, 2015

(54) WIRELESS TRACKING AND MONITORING ELECTRONIC SEAL

(71) Applicant: Deal Magic Inc., Houston, TX (US)

(72) Inventor: Timothy Dirk Stevens, Boulder, CO (US)

(73) Assignee: Deal Magic Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,878

(22) Filed: Apr. 29, 2013

(65) Prior Publication Data

US 2013/0314233 A1  Nov. 28, 2013

Related U.S. Application Data

(63) Continuation of application No. 12/510,990, filed on Jul. 28, 2009, now Pat. No. 8,456,302.

(60) Provisional application No. 61/225,525, filed on Jul. 14, 2009.

(51) Int. Cl.
*G08B 13/08* (2006.01)
*G08B 13/02* (2006.01)
*G01S 5/00* (2006.01)

(52) U.S. Cl.
CPC ............... *G08B 13/02* (2013.01); *G01S 5/0027* (2013.01)

(58) Field of Classification Search
CPC .............................. G08B 13/02; G01S 5/0027
USPC ........ 340/506, 539.1, 539.11, 539.13, 539.31
See application file for complete search history.

(56) References Cited

U.S. PATENT DOCUMENTS 690,191 A   12/1901  Saxe
3,242,625 A  3/1966  Tillinghast
(Continued)

FOREIGN PATENT DOCUMENTS

CN   1676842 A   10/2005
CN   1989513     6/2007
(Continued)

OTHER PUBLICATIONS

"Hercules "Zigbee" e-Seal Bolt". Bolt eSeal Electronic Seals—TydenBrooks. Retrieved from the internet: URL<URL: http://www.tydenbrooks.com/Products/Electronic-Seals/Bolt-eSeal.aspx>, Aug. 2, 2012. 2 pages.
(Continued)

*Primary Examiner* — Daryl Pope
(74) *Attorney, Agent, or Firm* — Fish & Richardson P.C.

(57) ABSTRACT

An electronic security seal (e-Seal) is disclosed. The e-Seal monitors security of shipments including intermodal containers, reports tampers in real-time, monitors environmental status of goods and reports exceptions in real-time, and reports the location of the shipment with high frequency. The security monitoring complies with the ISO 17712 standard, adding electronic real-time reporting of tamper time and location and LED tamper indication. The e-Seal can be manufactured and operated at low cost due to diagnostic and logistic features. The e-Seal supports low cost upgrades due to a modular architecture allowing a plug-in update of separate functions. The e-Seal allows flexible usage across supply chain tradelanes, due to highly programmable operation including over-the-air remote programming via wireless communications. The e-Seal provides low power operation to save battery usage and lower costs.

10 Claims, 10 Drawing Sheets

(56) References Cited

U.S. PATENT DOCUMENTS

| | | |
|---|---|---|
| 3,993,987 A | 11/1976 | Stevens |
| 4,233,595 A | 11/1980 | Landkammer |
| 4,466,288 A | 8/1984 | Grynberg et al. |
| 4,507,654 A | 3/1985 | Stolarczyk et al. |
| 4,729,626 A | 3/1988 | Stieff |
| 4,736,857 A | 4/1988 | Monico, Jr. et al. |
| 4,750,197 A | 6/1988 | Denekamp et al. |
| 5,151,684 A | 9/1992 | Johnsen |
| 5,189,396 A | 2/1993 | Stobbe et al. |
| 5,266,925 A | 11/1993 | Vercellotti et al. |
| 5,483,666 A | 1/1996 | Yamada et al. |
| 5,491,486 A | 2/1996 | Welles et al. |
| 5,515,030 A | 5/1996 | Citron et al. |
| 5,565,858 A | 10/1996 | Guthrie |
| 5,656,996 A | 8/1997 | Houser |
| 5,664,292 A | 9/1997 | Chen |
| 5,710,973 A | 1/1998 | Yamada et al. |
| 5,752,218 A | 5/1998 | Harrison et al. |
| 5,758,263 A | 5/1998 | Berger et al. |
| 5,774,876 A | 6/1998 | Woolley et al. |
| 5,798,460 A | 8/1998 | Nakagawa et al. |
| 5,815,407 A | 9/1998 | Huffman et al. |
| 5,827,965 A | 10/1998 | Nakagawa et al. |
| 5,861,810 A | 1/1999 | Nguyen |
| 5,946,350 A | 8/1999 | Uesugi |
| 5,959,529 A | 9/1999 | Kail, IV |
| 6,026,690 A | 2/2000 | Nakagawa et al. |
| 6,069,563 A | 5/2000 | Kadner et al. |
| 6,075,443 A | 6/2000 | Schepps et al. |
| 6,147,644 A | 11/2000 | Castles |
| 6,243,005 B1 | 6/2001 | Haimovich et al. |
| 6,249,252 B1 | 6/2001 | Dupray |
| 6,265,973 B1 | 7/2001 | Brammall et al. |
| 6,292,108 B1 | 9/2001 | Straser et al. |
| 6,304,211 B1 | 10/2001 | Boman |
| 6,420,971 B1 | 7/2002 | Leck et al. |
| 6,437,702 B1 | 8/2002 | Ragland et al. |
| 6,469,627 B1 | 10/2002 | Forster |
| 6,496,766 B1 | 12/2002 | Bernold et al. |
| 6,529,131 B2 | 3/2003 | Wentworth |
| 6,571,213 B1 | 5/2003 | Altendahl et al. |
| 6,727,817 B2 | 4/2004 | Maloney |
| 6,736,768 B2 | 5/2004 | Felt et al. |
| 6,747,558 B1 | 6/2004 | Thorne |
| 6,753,775 B2 | 6/2004 | Auerbach et al. |
| 6,778,083 B2 | 8/2004 | Auerbach et al. |
| 6,792,353 B2 | 9/2004 | Lin |
| 6,879,962 B1 | 4/2005 | Smith et al. |
| 6,919,803 B2 | 7/2005 | Breed |
| 6,927,688 B2 | 8/2005 | Tice |
| 6,965,313 B1 | 11/2005 | Saylor et al. |
| 6,965,604 B1 | 11/2005 | Sato |
| 6,972,682 B2 | 12/2005 | Lareau et al. |
| 6,990,335 B1 | 1/2006 | Shamoon et al. |
| 7,019,683 B2 | 3/2006 | Stevens et al. |
| 7,035,856 B1 | 4/2006 | Morimoto |
| 7,044,374 B2 | 5/2006 | Allison et al. |
| 7,049,963 B2 | 5/2006 | Waterhouse et al. |
| 7,072,668 B2 | 7/2006 | Chou |
| 7,098,784 B2 | 8/2006 | Easley et al. |
| 7,106,244 B2 | 9/2006 | Hsu |
| 7,113,090 B1 | 9/2006 | Saylor et al. |
| 7,129,837 B2 | 10/2006 | Shannon |
| 7,136,830 B1 | 11/2006 | Kuelbs et al. |
| 7,136,832 B2 | 11/2006 | Li et al. |
| 7,164,986 B2 | 1/2007 | Humphries et al. |
| 7,193,557 B1 | 3/2007 | Kovacich et al. |
| 7,196,621 B2 | 3/2007 | Kochis |
| 7,196,622 B2 | 3/2007 | Lambright |
| 7,212,829 B1 | 5/2007 | Lau et al. |
| 7,239,238 B2 | 7/2007 | Tester et al. |
| 7,257,397 B2 | 8/2007 | Shamoon et al. |
| 7,274,332 B1 | 9/2007 | Dupray |
| 7,275,651 B2 | 10/2007 | Morales et al. |
| 7,286,683 B2 | 10/2007 | Hadell |
| 7,298,327 B2 | 11/2007 | Dupray et al. |
| 7,299,007 B2 | 11/2007 | Eskin |
| 7,312,752 B2 | 12/2007 | Smith et al. |
| 7,315,281 B2 | 1/2008 | Dejanovic et al. |
| 7,336,152 B2 | 2/2008 | Horwitz et al. |
| 7,336,170 B2 | 2/2008 | Auerbach et al. |
| 7,339,469 B2 | 3/2008 | Braun |
| 7,339,473 B2 | 3/2008 | Lucas |
| 7,350,383 B1 | 4/2008 | Kuo |
| 7,382,251 B2 | 6/2008 | Bohman et al. |
| 7,385,500 B2 | 6/2008 | Irwin |
| 7,385,529 B2 | 6/2008 | Hersh et al. |
| 7,391,321 B2 | 6/2008 | Twitchell, Jr. |
| 7,394,361 B1 | 7/2008 | Twitchell, Jr. |
| 7,423,535 B2 | 9/2008 | Chung et al. |
| 7,467,032 B2 | 12/2008 | Kane et al. |
| 7,471,203 B2 | 12/2008 | Worthy et al. |
| 7,479,877 B2 | 1/2009 | Mortenson |
| 7,482,920 B2 | 1/2009 | Joao |
| RE40,642 E | 2/2009 | Harrison et al. |
| 7,498,938 B2 | 3/2009 | Ulrich |
| 7,499,997 B2 | 3/2009 | Hancock et al. |
| 7,525,484 B2 | 4/2009 | Dupray et al. |
| 7,536,321 B2 | 5/2009 | Takahashi et al. |
| 7,538,672 B2 | 5/2009 | Lockyer |
| 7,612,669 B2 | 11/2009 | Brigham |
| 7,616,116 B2 | 11/2009 | Ehrensvard et al. |
| 7,623,033 B2 | 11/2009 | Ainsworth et al. |
| 7,633,389 B2 | 12/2009 | Mantovani |
| 7,639,131 B2 | 12/2009 | Mock et al. |
| 7,643,823 B2 | 1/2010 | Shamoon et al. |
| 7,652,576 B1 | 1/2010 | Crossno et al. |
| 7,657,468 B1 | 2/2010 | Whiteley et al. |
| 7,668,532 B2 | 2/2010 | Shamoon et al. |
| 7,688,207 B2 | 3/2010 | Fritchie et al. |
| 7,707,076 B1 | 4/2010 | Whiteley et al. |
| 7,714,778 B2 | 5/2010 | Dupray |
| 7,724,138 B2 | 5/2010 | Horwitz et al. |
| 7,746,228 B2 | 6/2010 | Sensenig et al. |
| 7,760,103 B2 | 7/2010 | Frank |
| 7,764,231 B1 | 7/2010 | Karr et al. |
| 7,822,580 B2 | 10/2010 | Mustonen |
| 7,825,803 B2 | 11/2010 | Neff et al. |
| 7,830,852 B2 | 11/2010 | Twitchell, Jr. |
| 7,853,480 B2 | 12/2010 | Taylor et al. |
| 7,864,061 B2 | 1/2011 | Frank |
| 7,903,029 B2 | 3/2011 | Dupray |
| 7,936,266 B2 | 5/2011 | Francis et al. |
| 7,937,244 B2 | 5/2011 | Kadaba |
| 7,967,467 B2 | 6/2011 | Devaney et al. |
| 7,973,536 B2 | 7/2011 | Kojovic et al. |
| 7,986,238 B2 | 7/2011 | Cho |
| 7,990,270 B2 | 8/2011 | Mostov |
| 7,990,947 B2 | 8/2011 | Twitchell et al. |
| 8,032,153 B2 | 10/2011 | Dupray et al. |
| 8,064,935 B2 | 11/2011 | Shamoon et al. |
| 8,068,023 B2 | 11/2011 | Dulin et al. |
| 8,082,094 B2 | 12/2011 | Gao |
| 8,082,096 B2 | 12/2011 | Dupray |
| 8,135,413 B2 | 3/2012 | Dupray |
| 8,164,458 B2 | 4/2012 | Mostov |
| 8,217,785 B2 | 7/2012 | Steer |
| 8,228,192 B2 | 7/2012 | Eckert et al. |
| 8,314,704 B2 | 11/2012 | Cova et al. |
| 8,334,773 B2 | 12/2012 | Cova et al. |
| 8,432,274 B2 | 4/2013 | Cova et al. |
| 8,456,302 B2 * | 6/2013 | Stevens ............... 340/539.31 |
| 8,593,280 B2 | 11/2013 | Tan |
| 2001/0022558 A1 | 9/2001 | Karr, Jr. et al. |
| 2002/0030625 A1 | 3/2002 | Cavallaro |
| 2002/0075291 A1 | 6/2002 | Van Gestel et al. |
| 2002/0100300 A1 | 8/2002 | Reeb et al. |
| 2002/0104013 A1 | 8/2002 | Ghazarian |
| 2002/0113704 A1 | 8/2002 | Hess |
| 2002/0177476 A1 | 11/2002 | Chou |
| 2003/0055689 A1 | 3/2003 | Block |
| 2003/0106917 A1 | 6/2003 | Shetler |
| 2003/0126024 A1 | 7/2003 | Crampton et al. |
| 2003/0146871 A1 | 8/2003 | Karr et al. |

(56) References Cited

U.S. PATENT DOCUMENTS

| | | |
|---|---|---|
| 2003/0171948 A1 | 9/2003 | Thomas et al. |
| 2003/0195791 A1 | 10/2003 | Waller et al. |
| 2003/0200100 A1 | 10/2003 | Wen et al. |
| 2003/0222820 A1 | 12/2003 | Karr et al. |
| 2003/0227392 A1 | 12/2003 | Ebert et al. |
| 2003/0233189 A1 | 12/2003 | Hsiao et al. |
| 2004/0024644 A1 | 2/2004 | Gui |
| 2004/0055345 A1 | 3/2004 | Moore |
| 2004/0088107 A1 | 5/2004 | Seligmann |
| 2004/0100379 A1 | 5/2004 | Boman et al. |
| 2004/0113783 A1 | 6/2004 | Yagesh |
| 2004/0113933 A1 | 6/2004 | Guler |
| 2004/0124977 A1 | 7/2004 | Biffar |
| 2004/0181334 A1 | 9/2004 | Blumbergs |
| 2004/0183673 A1 | 9/2004 | Nageli |
| 2004/0193466 A1 | 9/2004 | Kull et al. |
| 2004/0198386 A1 | 10/2004 | Dupray |
| 2004/0199411 A1 | 10/2004 | Bertram et al. |
| 2004/0202154 A1 | 10/2004 | Aklepi et al. |
| 2004/0210847 A1 | 10/2004 | Berson |
| 2004/0227630 A1 | 11/2004 | Shannon et al. |
| 2004/0246130 A1 | 12/2004 | Lambright et al. |
| 2004/0249722 A1 | 12/2004 | Sugamura |
| 2004/0257225 A1 | 12/2004 | Webb, Sr. et al. |
| 2005/0055237 A1 | 3/2005 | Schmidtberg et al. |
| 2005/0091091 A1 | 4/2005 | Bjerre et al. |
| 2005/0154527 A1 | 7/2005 | Ulrich |
| 2005/0156736 A1 | 7/2005 | Rajapakse et al. |
| 2005/0171856 A1 | 8/2005 | Takahashi |
| 2005/0219037 A1 | 10/2005 | Huang |
| 2005/0231365 A1 | 10/2005 | Tester |
| 2005/0248454 A1 | 11/2005 | Hanson et al. |
| 2005/0256731 A1 | 11/2005 | Mougey et al. |
| 2006/0047379 A1 | 3/2006 | Schullian et al. |
| 2006/0054705 A1 | 3/2006 | Garton et al. |
| 2006/0101897 A1 | 5/2006 | Masuya et al. |
| 2006/0109109 A1 | 5/2006 | Rajapakse et al. |
| 2006/0109114 A1 | 5/2006 | Watts et al. |
| 2006/0116893 A1 | 6/2006 | Carnes et al. |
| 2006/0123766 A1 | 6/2006 | Wassenhoven |
| 2006/0145837 A1 | 7/2006 | Horton et al. |
| 2006/0155591 A1 | 7/2006 | Altaf et al. |
| 2006/0164232 A1 | 7/2006 | Waterhouse et al. |
| 2006/0184290 A1 | 8/2006 | Kane et al. |
| 2006/0200560 A1 | 9/2006 | Waugh |
| 2006/0202824 A1 | 9/2006 | Carroll et al. |
| 2006/0202825 A1 | 9/2006 | Rajapakse et al. |
| 2006/0224398 A1 | 10/2006 | Lakshman |
| 2006/0229895 A1 | 10/2006 | Kodger |
| 2006/0232398 A1 | 10/2006 | Nedblake et al. |
| 2006/0237490 A1 | 10/2006 | Twitchell |
| 2006/0238332 A1 | 10/2006 | Carle et al. |
| 2006/0255934 A1 | 11/2006 | Easley et al. |
| 2006/0288744 A1 | 12/2006 | Smith |
| 2007/0001854 A1 | 1/2007 | Chung et al. |
| 2007/0043538 A1 | 2/2007 | Johnson et al. |
| 2007/0046459 A1 | 3/2007 | Silverman et al. |
| 2007/0056369 A1 | 3/2007 | Griffin et al. |
| 2007/0132547 A1 | 6/2007 | Jung |
| 2007/0145130 A1 | 6/2007 | Danilewitz |
| 2007/0150379 A1 | 6/2007 | Vernaci et al. |
| 2007/0182556 A1 | 8/2007 | Rado et al. |
| 2007/0216542 A1 | 9/2007 | Brosius et al. |
| 2007/0222232 A1 | 9/2007 | Held |
| 2007/0222674 A1 | 9/2007 | Tan et al. |
| 2007/0241888 A1 | 10/2007 | Mantovani |
| 2007/0247366 A1 | 10/2007 | Smith et al. |
| 2007/0252696 A1 | 11/2007 | Belisle et al. |
| 2007/0262861 A1 | 11/2007 | Anderson et al. |
| 2007/0285232 A1 | 12/2007 | Bohman et al. |
| 2008/0002488 A1 | 1/2008 | Hasegawa |
| 2008/0006696 A1 | 1/2008 | Piersol et al. |
| 2008/0039019 A1 | 2/2008 | Eskin |
| 2008/0039020 A1 | 2/2008 | Eskin |
| 2008/0040244 A1 | 2/2008 | Ricciuti et al. |
| 2008/0040272 A1 | 2/2008 | Eskin |
| 2008/0041124 A1 | 2/2008 | Rudd |
| 2008/0042809 A1 | 2/2008 | Watts et al. |
| 2008/0074265 A1 | 3/2008 | Schoen |
| 2008/0086391 A1 | 4/2008 | Maynard et al. |
| 2008/0086455 A1 | 4/2008 | Meisels et al. |
| 2008/0094209 A1 | 4/2008 | Braun et al. |
| 2008/0094256 A1 | 4/2008 | Koen |
| 2008/0111693 A1 | 5/2008 | Johnson et al. |
| 2008/0143516 A1 | 6/2008 | Mock et al. |
| 2008/0150698 A1 | 6/2008 | Smith et al. |
| 2008/0157974 A1 | 7/2008 | Boss et al. |
| 2008/0167049 A1 | 7/2008 | Karr et al. |
| 2008/0186166 A1 | 8/2008 | Zhou et al. |
| 2008/0224875 A1 | 9/2008 | Phillips et al. |
| 2008/0231459 A1 | 9/2008 | Corder |
| 2008/0248813 A1 | 10/2008 | Chatterjee et al. |
| 2008/0252428 A1 | 10/2008 | Robinson et al. |
| 2008/0281618 A1 | 11/2008 | Mermet et al. |
| 2008/0309487 A1 | 12/2008 | Chao |
| 2009/0015400 A1 | 1/2009 | Breed |
| 2009/0030715 A1 | 1/2009 | Robb et al. |
| 2009/0060349 A1 | 3/2009 | Linaker et al. |
| 2009/0083123 A1 | 3/2009 | Powell et al. |
| 2009/0102657 A1 | 4/2009 | Evans et al. |
| 2009/0102660 A1 | 4/2009 | Evans et al. |
| 2009/0121877 A1 | 5/2009 | Henderson |
| 2009/0134999 A1 | 5/2009 | Dobson et al. |
| 2009/0135015 A1 | 5/2009 | Dobson et al. |
| 2009/0140886 A1 | 6/2009 | Bender |
| 2009/0146805 A1 | 6/2009 | Joao |
| 2009/0146832 A1 | 6/2009 | Ebert et al. |
| 2009/0167536 A1 | 7/2009 | Clark et al. |
| 2009/0177394 A1 | 7/2009 | Walz et al. |
| 2009/0201169 A1 | 8/2009 | d'Hont et al. |
| 2009/0216775 A1 | 8/2009 | Ratliff et al. |
| 2009/0234493 A1 | 9/2009 | Pandit et al. |
| 2009/0289786 A1 | 11/2009 | Koch |
| 2009/0308000 A1 | 12/2009 | Corcoran |
| 2009/0322510 A1 | 12/2009 | Berger et al. |
| 2009/0326971 A1 | 12/2009 | Piccinini et al. |
| 2010/0012653 A1 | 1/2010 | Ulrich et al. |
| 2010/0039284 A1 | 2/2010 | Hall et al. |
| 2010/0045436 A1 | 2/2010 | Rinkes |
| 2010/0066501 A1 | 3/2010 | Ulrich et al. |
| 2010/0066561 A1 | 3/2010 | Ulrich et al. |
| 2010/0073229 A1 | 3/2010 | Pattabiraman et al. |
| 2010/0076902 A1 | 3/2010 | Kraft |
| 2010/0090822 A1 | 4/2010 | Benson et al. |
| 2010/0095864 A1 | 4/2010 | Forbes |
| 2010/0116932 A1 | 5/2010 | Helou, Jr. |
| 2010/0141393 A1 | 6/2010 | Daniel |
| 2010/0141445 A1 | 6/2010 | Venkatasubramaniyam et al. |
| 2010/0145739 A1 | 6/2010 | Erhart et al. |
| 2010/0234045 A1 | 9/2010 | Karr et al. |
| 2010/0237711 A1 | 9/2010 | Parsons |
| 2010/0238032 A1 | 9/2010 | Greene |
| 2010/0277280 A1 | 11/2010 | Burkart et al. |
| 2010/0312715 A1 | 12/2010 | Esque et al. |
| 2010/0319261 A1 | 12/2010 | Beck |
| 2011/0016391 A1 | 1/2011 | Borovsky |
| 2011/0046775 A1 | 2/2011 | Bailey et al. |
| 2011/0050397 A1 | 3/2011 | Cova |
| 2011/0054979 A1 | 3/2011 | Cova et al. |
| 2011/0120199 A1 | 5/2011 | Auerbach et al. |
| 2011/0128143 A1 | 6/2011 | Daniel |
| 2011/0133888 A1 | 6/2011 | Stevens et al. |
| 2011/0133932 A1 | 6/2011 | Tan et al. |
| 2011/0163914 A1 | 7/2011 | Seymour |
| 2011/0258930 A1 | 10/2011 | Francis et al. |
| 2011/0260867 A1 | 10/2011 | McCracken |
| 2011/0266338 A1 | 11/2011 | Babcock et al. |
| 2011/0283750 A1 | 11/2011 | Will |
| 2011/0289320 A1 | 11/2011 | Twitchell et al. |
| 2012/0009872 A1 | 1/2012 | Lane et al. |
| 2012/0058775 A1 | 3/2012 | Dupray et al. |
| 2012/0068846 A1 | 3/2012 | Dalzell |
| 2012/0069131 A1 | 3/2012 | Abelow |
| 2012/0094638 A1 | 4/2012 | Shamoon et al. |

(56) References Cited

U.S. PATENT DOCUMENTS

| | | | |
|---|---|---|---|
| 2012/0154163 A1 | 6/2012 | Jones | |
| 2012/0182180 A1 | 7/2012 | Wolf et al. | |
| 2012/0190380 A1 | 7/2012 | Dupray et al. | |
| 2012/0303498 A1 | 11/2012 | Cova et al. | |
| 2012/0310854 A1 | 12/2012 | Cova et al. | |

FOREIGN PATENT DOCUMENTS

| | | |
|---|---|---|
| CN | 101251886 | 8/2008 |
| GB | 2368174 | 4/2002 |
| GB | 2448482 | 10/2008 |
| JP | 2003275022 A | 9/2003 |
| JP | 2005-092746 A | 4/2005 |
| KR | 2011080908 A | 7/2011 |
| KR | 2011099470 A | 9/2011 |
| NZ | 541176 | 2/2008 |
| WO | WO9801772 A2 | 1/1998 |
| WO | WO9848396 A1 | 10/1998 |
| WO | WO 03/098175 | 11/2003 |
| WO | WO2004013731 A2 | 2/2004 |
| WO | WO 2006/053566 | 5/2006 |
| WO | WO2006078285 A2 | 7/2007 |
| WO | WO 2007/121508 | 11/2007 |
| WO | WO 2010/077688 | 7/2010 |
| WO | WO 2011/008871 | 1/2011 |
| WO | WO 2011/014708 | 2/2011 |
| WO | WO 2011/022412 | 2/2011 |
| WO | WO 2011/025821 | 3/2011 |
| WO | WO 2011/025829 | 3/2011 |
| WO | WO 2011/025987 | 3/2011 |

OTHER PUBLICATIONS

Bajikar, Sundeep. "Trusted Platform Module (TPM) based Security on Notebook PCs—White Paper", Jun. 20, 2002, Mobile Platforms Group, Intel Corporation. Retrieved from the internet: URL<http://www.intel.com/design/mobile/platform/downloads/Trusted_Platform_Module_White_Paper.pdf>, Aug. 2, 2012. 20 pages.
Chin, Le-Pong, et al. "The Role of Electronic Container Seal (E-Seal) with RFID Technology in the Container Security Initiatives." Proceedings of the International Conference on MEMS, NANO and Smart Systems 2004. ICMENS. Aug. 25-27, 2004. pp. 116-120.
FAQ, Trusted Computing group—Developers. Retrieved from the Internet: URL<http://www.trustedcomputinggroup.org/faq/TPMFAQ/>, Oct. 19, 2010. 2 pages.
GlobalTrak, "GlobalTrak+ Asset Monitoring Unit." GlobalTrak Product Brochure/Datasheet. Published Pre-Oct. 1, 2009. 2 pages.
Liaw, M. and Cova, N., "Data Quality Delivered," A Savi Networks White Paper, copyright 2006, 19 pages.
Maersk Line, "Maersk Line Shipping Containers Worldwide". Retrieved from internet: URL<http://www.maerskline.com/link/?page=brochure&path=/our_services/our_e-commerce_services/maerskline.com/the_shipping_process/tracking>, dated Aug. 19, 2009. 7 pages.
Simmons et al., "Learning to Predict Driver Route and Destination Intent", Sep. 17-20, 2006, Proceedings of the 2006 IEEE Intelligent Transportation System Conference, pp. 127-132.
Siror, Joseph, et al. "Impact of RFID Technology on Tracking of Export Goods in Kenya." From Journal of Convergence Information Technology, vol. 5, No. 9. Nov. 2010. pp. 190-200.
European Office Action for Patent Application No. 10800498.7, dated Dec. 19, 2012, 14 pages.
European Search Report in Application No. 10800498.7, mailed Dec. 3, 2012, 3 pages.
International Preliminary Report on Patentability, PCT Application Serial No. PCT/US2009/067210, received Jun. 23, 2011, 8 pp.
International Preliminary Report on Patentability, PCT Application Serial No. PCT/US2010/041994 filed Jul. 14, 2010, received Jan. 17, 2012, 11 pp.
International Preliminary Report on Patentability, PCT Application Serial No. PCT/US2010/042014 filed Jul. 14, 2010, Received Jan. 17, 2012, 7 pp.
International Preliminary Report on Patentability, PCT Application Serial No. PCT/US2010/043795 filed Jul. 29, 2010, received Jan. 31, 2012, 9 pp.
International Preliminary Report on Patentability, PCT Application Serial No. PCT/US2010/045776 filed Aug. 17, 2010, received Feb. 21, 2012, 9 pp.
International Preliminary Report on Patentability, PCT Application Serial No. PCT/US2010/046640 filed Aug. 25 2010, mailed Mar. 6, 2012, 8 pp.
International Preliminary Report on Patentability, PCT Application Serial No. PCT/US2010/046655, mailed Mar. 8, 2012, 8 pp.
International Preliminary Report on Patentability, PCT Application Serial No. PCT/US2010/047042 filed Aug. 27, 2010, received Feb. 28, 2012, 8 pp.
International Search Report and Written Opinion of the International Searching Authority, PCT Application Serial No. PCT/US2009/067210, received Feb. 4, 2010, 9 pp.
International Search Report and Written Opinion of the International Searching Authority, PCT Application Serial No. PCT/US2010/041994 filed Jul. 14, 2010, received Sep. 14, 2010, 12 pp.
International Search Report and Written Opinion of the International Searching Authority, PCT Application Serial No. PCT/US2010/042014 filed Jul. 14, 2010, Received Sep. 14, 2010, 8 pp.
International Search Report and Written Opinion of the International Searching Authority, PCT Application Serial No. PCT/US2010/043795 filed Jul. 29, 2010, received Sep. 17, 2010, 11 pp.
International Search Report and Written Opinion of the International Searching Authority, PCT Application Serial No. PCT/US2010/045776 filed Aug. 17, 2010, received Oct. 8, 2010, 14 pp.
International Search Report and Written Opinion of the International Searching Authority, PCT Application Serial No. PCT/US2010/046640 filed Aug. 25, 2010, mailed Oct. 18, 2010, 9 pp.
International Search Report and Written Opinion of the International Searching Authority, PCT Application Serial No. PCT/US2010/046655, mailed Oct. 20, 2010, 9 pp.
International Search Report and Written Opinion of the International Searching Authority, PCT Application Serial No. PCT/US2010/047042 filed Aug. 27, 2010, received Dec. 27, 2010, 11 pp.
Hungarian Intellectual Property Office, Written Opinion, Application No. 201201127-6 mailed Dec. 6, 2012, 7 pages.
European Search Report in Application No. 09836733.7, dated Sep. 26, 2013, 3 pages.
European Search Report in Application No. 13172053.4, dated Oct 9, 2013, 3 pages.
U.S. Appl. No. 60/411,042, filed Sep. 17, 2002, 8 pages.
Bohman, "How can electronic seals assure container integrity that mechanical seals cannot?" Mar. 3, 2003, 19 pages.
Northwest International Trade Corridor Program Phase Three, "Electronic Container Seals Field Operational Test Project, Task #2, Technology Review Report," Sep. 15, 2003, 34 pages.
Science Applications International Corporation, "Container Seal Technologies and Process Phase 1," Jul. 11, 2003, 114 pages.
Williams, "Smart transport—a survey of tracking technologies for cargo containers and their transport platforms," Sep. 2003, 85 pages.
Search Report; May 26, 2013; China; 201080031901.7; 4 pages.
Hungarian Intellectual Property Office, Written Opinion, Singapore Application No. 201201127-6 mailed Aug. 1, 2013, 6 pages.
European Search Report for App. No. EP 10 81 2680 dated Jul. 24, 2014, 5 pages.
European Search Report for App. No. EP 10 81 2585 dated Sep. 24, 2014, 7 pages.

* cited by examiner

WIRELESS TRACKING AND MONITORING ELECTRONIC SEAL

RELATED APPLICATION

This application claims the benefit of priority from U.S. patent application Ser. No. 12/510,990, for "Wireless Tracking and Monitoring Electronic Seal," filed Jul. 28, 2009, and U.S. Provisional Patent Application No. 61/225,525, for "Wireless Tracking and Monitoring Electronic Seal," filed Jul. 14, 2009, both of which are incorporated by reference herein in its entirety.

TECHNICAL FIELD

This subject matter is related generally to providing in-transit visibility of shipments in real-time.

BACKGROUND

Goods which are transported via intermodal shipping containers need to be monitored for the security of the container, the location of the container, and the environmental status of the goods. Mechanical security seals on container doors can be tampered and restored or replaced to approximate condition so as to pass a casual inspection, so that pilfered or tampered goods are not discovered until the container is opened at the destination. Conventional electronic security seals (e-Seals) improve upon mechanical seals, as they can provide a wireless report of a security tamper. e-Seals are limited by a need for external power such as from the cab of a truck, which is not available for other intermodal transport such as trains, barges or ships. Power consumption limits battery powered e-Seals to infrequent location and reporting updates. Environmental monitoring of the container goods can be performed using chart recorders inside the container, which do not provide real-time knowledge of temperature, humidity or shock damage to the goods until the container is opened at the destination. The practical use of conventional e-Seals is limited by the high cost of such devices.

SUMMARY

An improved electronic security seal (e-Seal) is disclosed. The e-Seal can monitor the security of shipments including intermodal containers, report tampers in real-time, monitor environmental status of the goods and report exceptions in real-time, and report the location of the shipment with sufficient frequency to allow management of supply chain exception events. The security monitoring complies with the ISO 17712 international standard for container security seals, adding electronic real-time reporting of tamper time and location as well as tamper indication to thwart undetected tampering. These security features greatly enhance the ability to decide the need to inspect a shipment mid-journey.

The e-Seal can be manufactured and operated at low cost due to a number of diagnostic and logistic features designed into the e-Seal. In addition the e-Seal supports low cost upgrades to multiple form factors and usages due to a modular architecture allowing a plug-in update of one function without requiring redesign of other e-Seal functions. The e-Seal allows flexible usage across a myriad of supply chain tradelanes, long and short, domestic and international, due to highly programmable operation including over-the-air remote programming via wireless communications. The e-Seal provides low power operation to save battery usage and lower costs.

DETAILED DESCRIPTION

Overall e-Seal System

Figure 1:
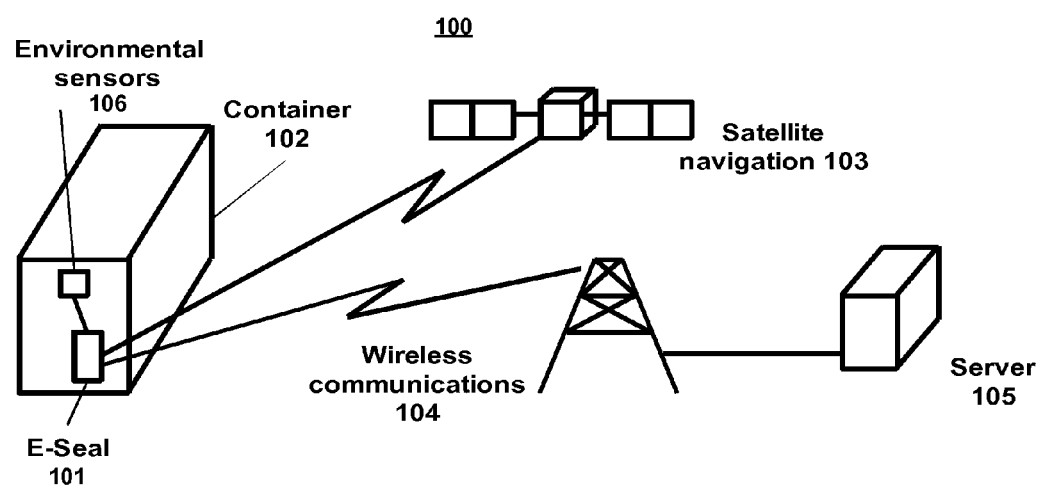
FIG. 1 is a block diagram of an example e-Seal system.

FIG. 1 is a block diagram of an example electronic security seal (e-Seal) system 100. The e-Seal system 100 can include an e-Seal 101, an asset 102 (e.g., a container 102), a navigation system 103 (e.g., GPS), a wireless communications system 104 and a tracking service 105 (e.g., a server). The description that follows is for an intermodal container (e.g., a shipping container). However, the e-Seal 101 can be used with any physical asset (e.g., tracking heavy machinery).

In some implementations, the e-Seal 101 mounts to the hasp of the door of the intermodal container 102. An interior set of environmental sensors 106 can be connected to the e-Seal 101 through a wireless interface. The e-Seal 101 can receive navigation signals from a location means, such as, for example, Global Navigation Satellite Systems (GNSS) 103. The e-Seal 101 can communicate through wireless cellular infrastructure 104 to a central server 105 which can be operated by a tracking service provider. The server 105 can monitor multiple e-Seals 101 on intermodal container shipments, to provide real-time in-transit visibility to customers of those shipments.

e-Seal Architecture

Figure 2:
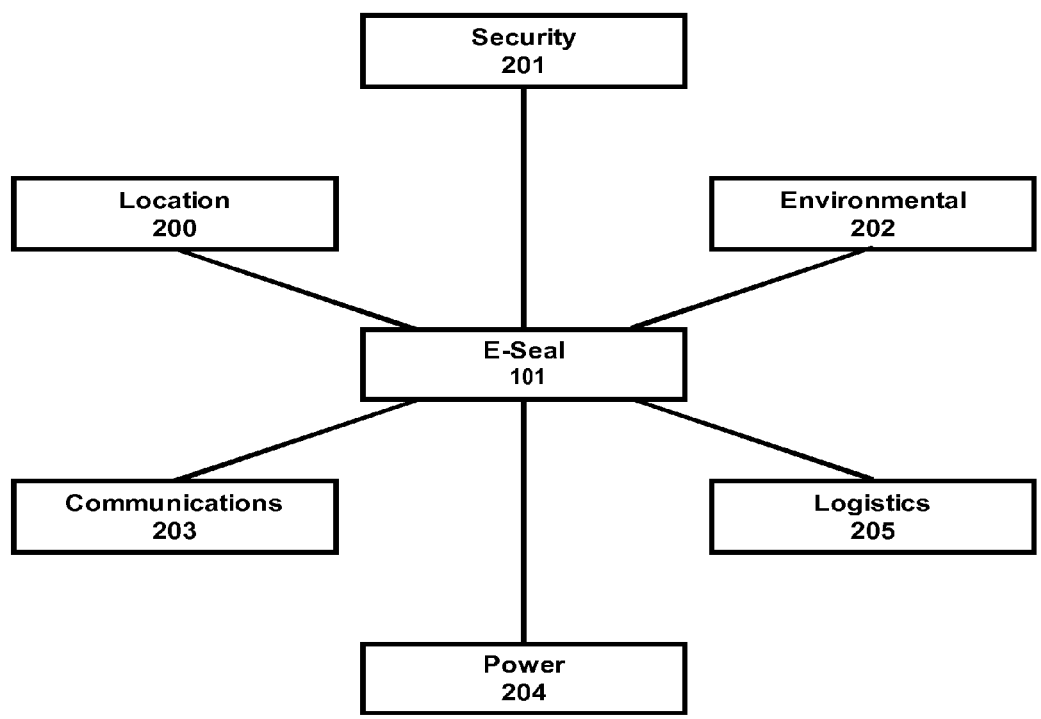
FIG. 2 is a diagram of the modular architecture of the e-Seal of FIG. 1.

FIG. 2 is a diagram of the modular architecture of the e-Seal 101. In some implementations, this architecture can be comprised of at least six modular functions. The architecture enables any one function to be changed or upgraded without changing the other five modular functions. This allows the e-Seal 101 to incorporate new technologies, while minimizing the costs and schedules of e-Seal upgrades.

One example implementation of the interface to the security function 201 is a two-wire circuit, where closed is secured and open is not secured. This can be implemented via a connector on the e-Seal 101 circuit board with a two-wire cable to the security function 201. The physical security mechanism, whether a bolt seal, cable seal, or indicative seal, can use the same e-Seal 101 circuit board, reducing costs and speeding schedule for providing these alternate security functions 201.

One example implementation of the interface to the power function 204 is a circuit with battery positive, battery negative and battery temperature. This can be implemented via a connector on the e-Seal 101 circuit board with a cable to the power function 204. The physical power mechanism, whether a 2-cell battery, 4-cell, or 6-cell, can use the same e-Seal 101 circuit board, reducing costs and speeding schedule for providing these alternate power functions 204. This allows the e-Seal 101 to be rapidly deployed across shorter domestic shipping tradelanes requiring lower cost smaller batteries, or longer international shipping tradelanes requiring larger batteries.

Similarly, the location function 200, environmental function 202, communications function 203 and logistics function 205, can all be upgraded to alternative implementations with minimal or no changes to other of the e-Seal functional modules. This allows the e-Seal to be provided as a low cost device, advancing the state of the art to a practical and affordable solution, improving on the high cost devices mentioned in the Background paragraph.

The location function 200 may be initially implemented using Global Positioning System (GPS) navigation satellites. This location function 200 may be updated to other location means including but not limited to: other Global Navigation Satellite Systems (GNSS); GNSS augmentations such as Satellite Based Augmentation Systems (SEAS), differential systems, or aiding systems; or beacon location systems such as Radio Frequency Identification (RFID), cellular identification (ID), WiFi, or Real Time Locating System (RTLS).

The security function 201 may be initially implemented using monitoring of locking the container doors. This security function 201 may be updated to other security monitors including door opening, light sensors, vibration sensors, as well as capability beyond standard intermodal containers such as refrigerated containers, other container form factors, or permanently designed into smart containers.

The environmental function 202 may be initially implemented using temperature, humidity or shock sensors. This environmental function 202 may be updated to other environmental monitors sensors including $CO_2$, other gases, smoke, light, sound, chemical, biological, radiation, or additional sensors.

The wireless communication function 203 may be initially implemented using cellular communications such as GSM/GPRS. This wireless communication function 203 may be updated to other wireless communications including HSDPA cellular, CDMA cellular, SMS cellular; satellite communication including IRIDIUM, ORBCOMM, Globalstar, Inmarsat GVS; RFID; ZigBee, Bluetooth, WiFi; or WiMax.

The power function 204 may be initially implemented using rechargeable batteries. This power function 204 may be updated to other methods of powering the e-Seal 101 including permanent non-rechargeable batteries, an external power source such as from refrigerated containers, thin film batteries, solar power recharging, or piezoelectric ambient vibration recharging.

The logistics function 205 may be initially implemented using a method of operating the wireless e-Seal with bar code labels and use of an external port for serial communications, battery recharging, and signaling turning the e-Seal to sleep mode. This logistics function 205 may be updated to other logistical labels, controls and interfaces including RFID labels, non-tamperable security enhanced labels; other means to turn to sleep mode; alternative serial communications; or logistical support with no physical port using wireless communications including GSM/GPRS, HSDPA, CDMA, SMS; satellite communication including IRIDIUM, ORBCOMM, Globalstar, Inmarsat GVS; RFID; ZigBee, Bluetooth, WiFi; or WiMax.

e-Seal Configuration

Figure 3:
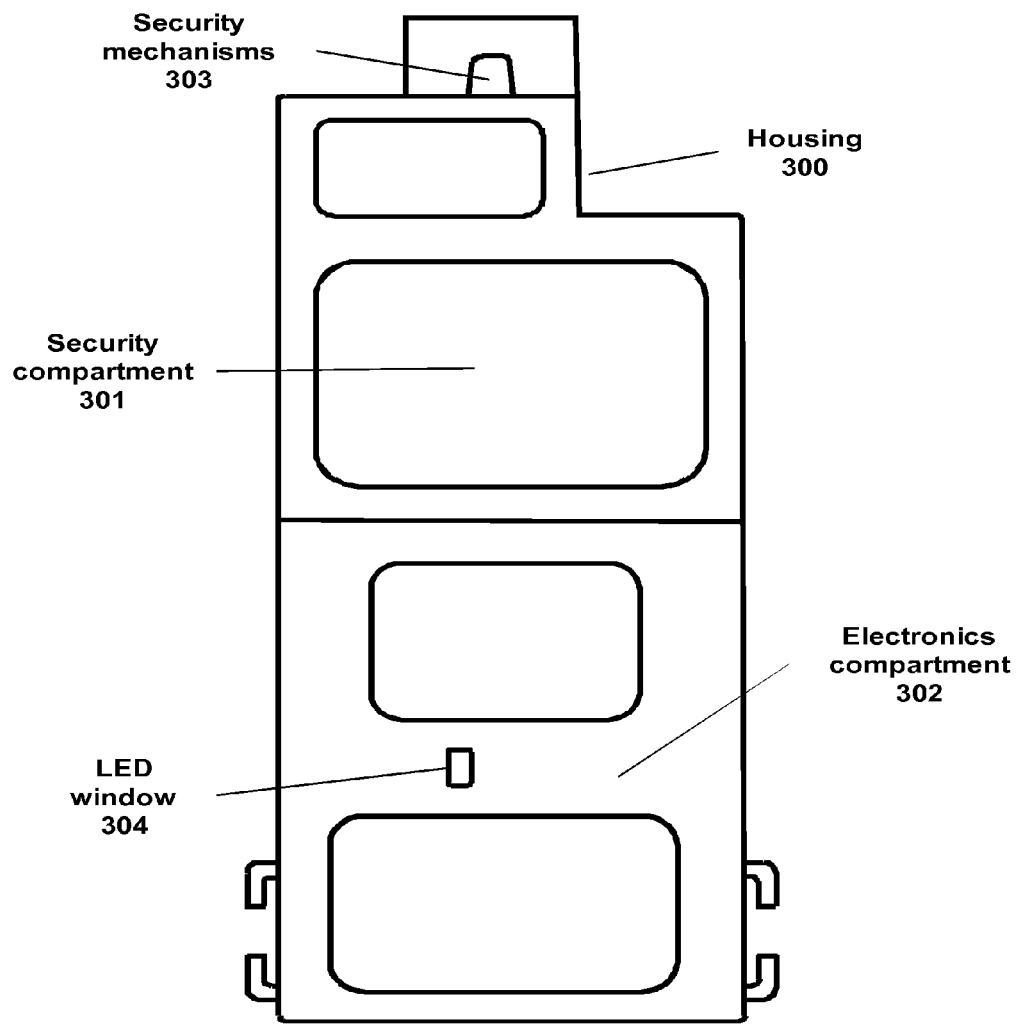
FIG. 3 is a physical diagram of an example e-Seal of FIG. 1.

FIG. 3 is a diagram of one example form of the e-Seal 101. The e-Seal components are contained within a housing 300 which is of robust construction to operate within the intermodal container shipping environment. The housing 300 includes a security compartment 301 and an electronics compartment 302. Various security mechanisms 303 can connect to the housing 300 and security compartment 301. Example security mechanisms 303 include bolt seals, indicative seals, or cable seals to monitor the security of locking of a container, or mechanical or light sensor mechanisms to monitor the closed door status of the container. In some implementations, the electronics compartment 302 can include a transparent window 304 to allow a Light Emitting Diode (LED) display of the e-Seal status.

e-Seal Design

Figure 4:
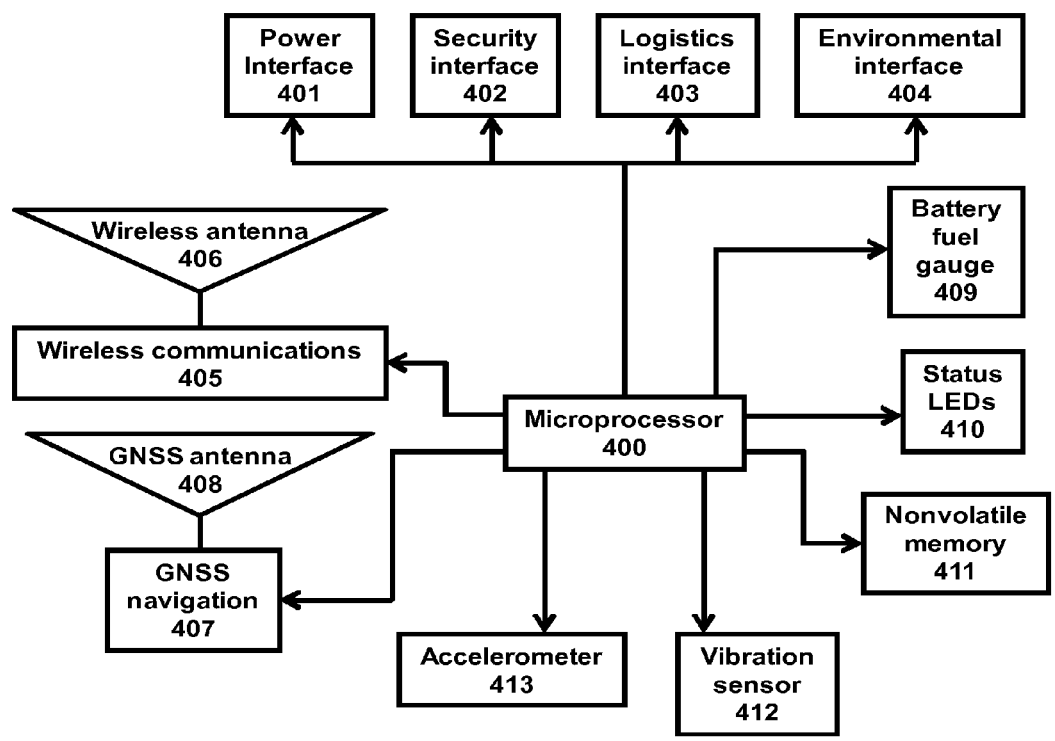
FIG. 4 is a block diagram of the e-Seal of FIG. 1.

FIG. 4 is a block diagram of the e-Seal 101. In some implementations, the e-Seal 101 can include a microprocessor 400, a power interface 401, a security interface 402, a logistics interface 403, an environmental interface 404, wireless communications 405, a wireless antenna 406, a navigation system 407 (e.g., GNSS), a navigation antenna 408, a battery fuel gauge 409, a status indicator 410 and memory 411 (e.g., non-volatile memory). Other implementations can include more or fewer components.

The microprocessor 400 controls the operation of the e-Seal 101. The microprocessor 400 can run off of a high speed clock when operating, or run off of a low speed clock when in sleep mode to conserve power. The microprocessor 400 is coupled to power interface 401, security interface 402, logistics interface 403 and environmental interface 404. The microprocessor 400 controls the wireless communications module 405 which is coupled to the wireless communications transmit/receive antenna 406. The microprocessor 400 controls the navigation module 407 (e.g., GNSS) which is coupled to the navigation antenna 408. The microprocessor 400 receives battery status information from the battery fuel gauge 409. The microprocessor 400 displays e-Seal status via a status indicator 410 (e.g., an LED display). The microprocessor 400 stores state information between wakeups, stored location and sensor data, and other system data in a memory 411 (e.g., non-volatile memory). The microprocessor 400 can be awakened by a vibration sensor 412 (or other sensor), and can read 2 or 3 axis acceleration measurements from an accelerometer 413. In some implementations, the microprocessor 400 can read measurements from a magnetometer or gyros for use in determining headings and orientations.

e-Seal Low Power Operation

Figure 5:
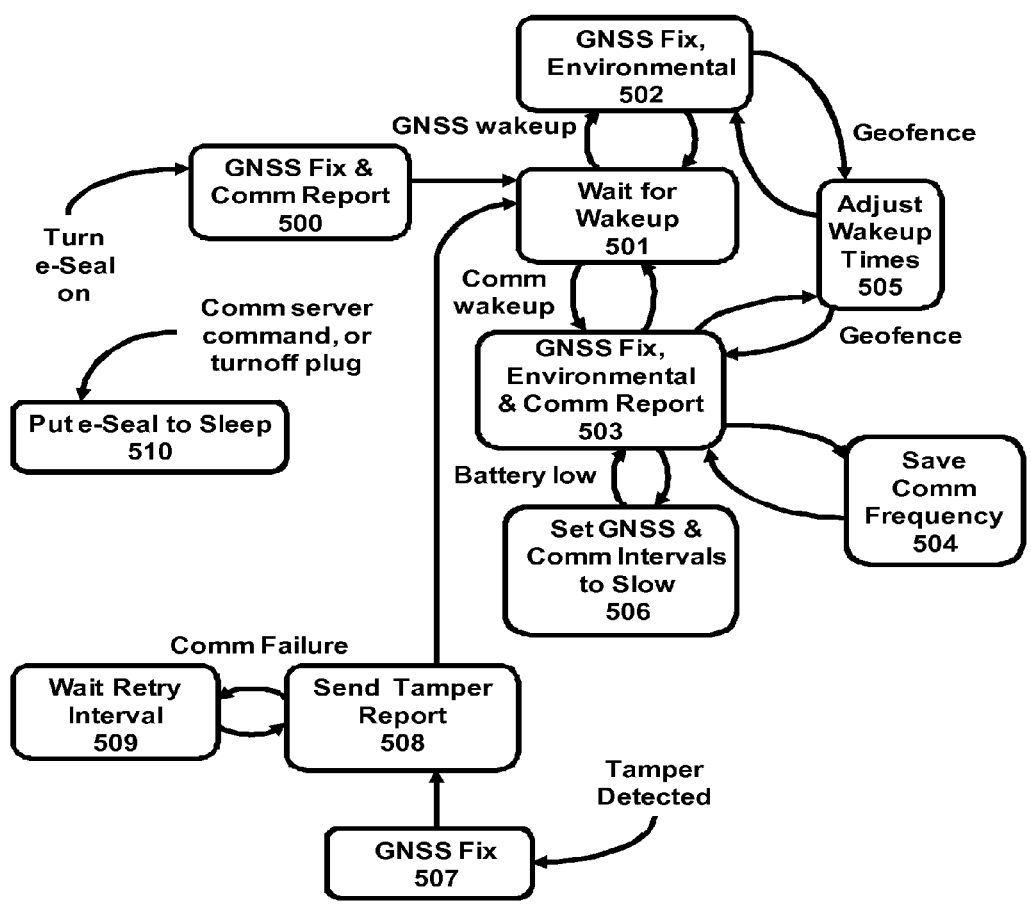
FIG. 5 is a state diagram of the low power operation of the e-Seal of FIG. 1.

FIG. 5 is a state diagram of the low power operation of the e-Seal 101. The e-Seal 101 can remain in a low power sleep mode when not in use on a container. When the e-Seal 101 is turned on via detecting a security bolt circuit closing or other commissioning event, a location fix can be measured and the start of the journey reported over wireless communications 500. The e-Seal 101 can then enter a low duty cycle operating mode 501, in which the e-Seal 101 briefly wakes up at intervals to measure location or environmental parameters 502, then returns to a low power sleep mode 501. The e-Seal 101 may also briefly wake up at intervals to measure location or environmental parameters and make a wireless communications report 503, then return to a low power sleep mode 501.

In some implementations, a battery fuel gauge monitors the battery capacity, for use in determining if the battery is low as compared to a programmable threshold. In the event of a low battery condition 506, the wakeup intervals for location fixes or wireless communications 500 can be slowed to programmable values, to extend the operation of the e-Seal 101 to the completion of the journey.

In some implementations, the e-Seal 101 can be programmed for each shipment usage, to reduce wireless communications power needs by customizing the frequency bands searched to those which will be available along the shipment tradelane, while remembering from one wakeup to the next which frequency band was last successful 504 to further reduce the need to search for a usable frequency band.

The e-Seal 101 can monitor for entry into a geofenced area, persisting in a geofenced area, or exiting a geofenced area. The occurrence of these geofence events 505 can reduce (or temporarily increase) the frequency of wakeup intervals based upon the need for location reporting in the geofenced portion of the shipment tradelane. For example, entry into a geofenced ocean region can suspend wakeups for wireless cellular reporting.

Upon detection of a tamper event, the e-Seal 101 wakes up from low power sleep mode, takes a location fix 507, and makes a wireless communications report 508. Should wireless communications not be available, the e-Seal 101 can return to low power sleep mode with a programmable interval for waking up to retry the wireless communications report 509.

Upon completion of a shipment, as indicated by a server (e.g., server 105) sending an over an air command, or by a user operating a turnoff plug in a connector located on the e-Seal 101 protected during secure operation by the security mechanism 303, the e-Seal 101 can return to the low power sleep mode 510.

The low power operation described above is one example of low power operation of the e-Seal 101. Other low power operations can be performed as well.

e-Seal Programmable Operation

Figure 6:
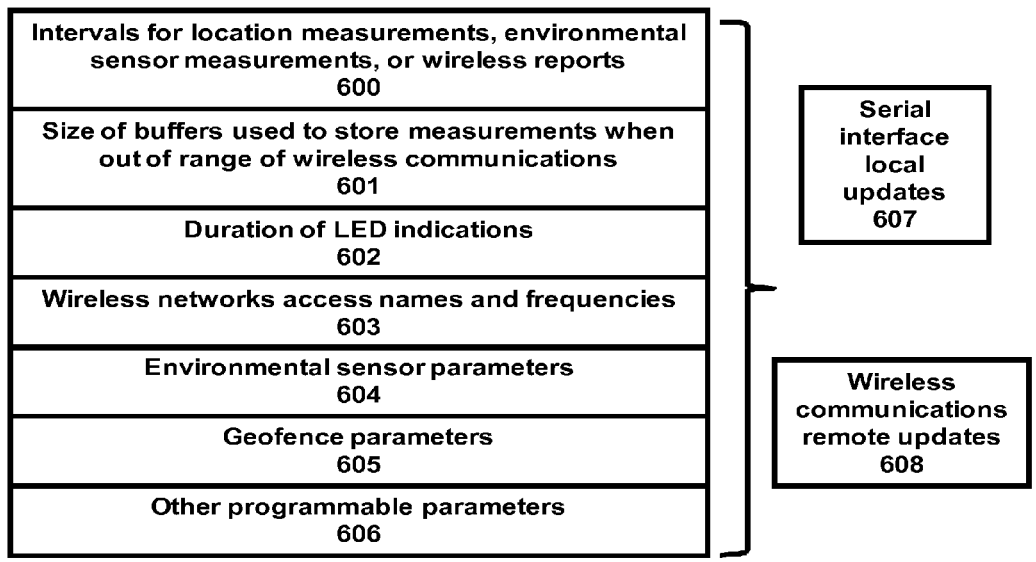
FIG. 6 is a diagram of the programmable operation of the e-Seal of FIG. 1.

FIG. 6 is a diagram of the programmable operation of the e-Seal 101. In some implementations, one set of parameters 600 can be programmed to vary the intervals for location measurements, environmental sensor measurements, or wireless reports. Another set of parameters 601 can be programmed to vary the size of buffers used to store measurements when out of range of wireless communications. Another set of parameters 602 can be programmed to vary the duration of status indications. Another set of parameters 603 can be programmed to vary the wireless networks access names and frequencies. Another set of parameters 604 can be programmed to vary the environmental sensors operating characteristics and thresholds. Another set of parameters 605 can be programmed to vary the geofence location definitions and actions to be taken upon entering, persisting or exiting a geofence. Additional parameters 606 can be defined and programmed for other characteristics of the e-Seal 101.

These various programmable parameters may be updated over a serial interface 607 prior to shipping the e-Seal 101 to the origin of an intermodal container shipment.

These various programmable parameters may be updated over wireless communications 608 when the e-Seal 101 has already been shipped to a remote customer location.

e-Seal Supply Chain Operation

Figure 7A:
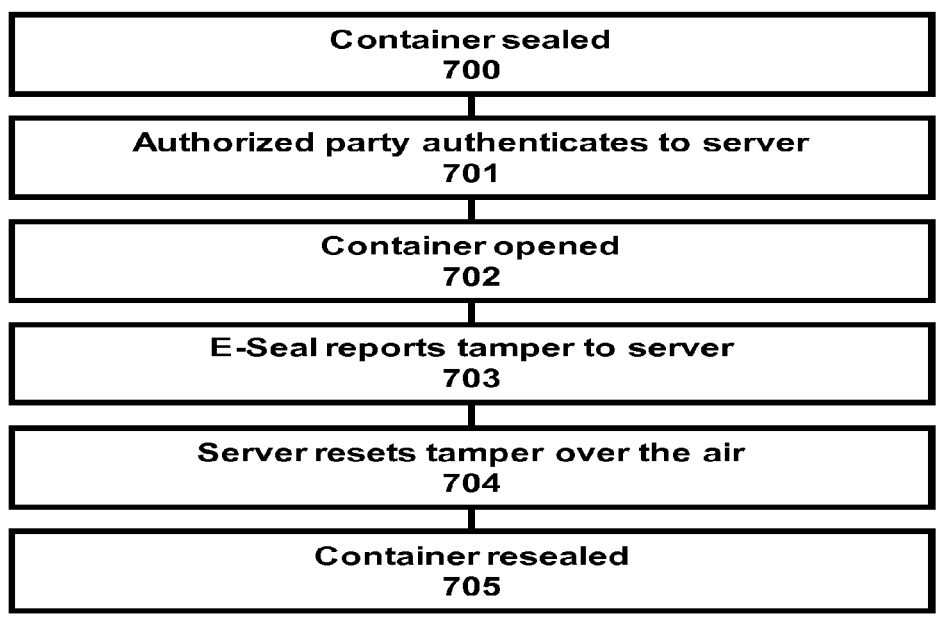
FIGS. 7A and 7B are flow diagrams of the operation across various supply chain conditions of the e-Seal of FIG. 1.
Figure 7B:
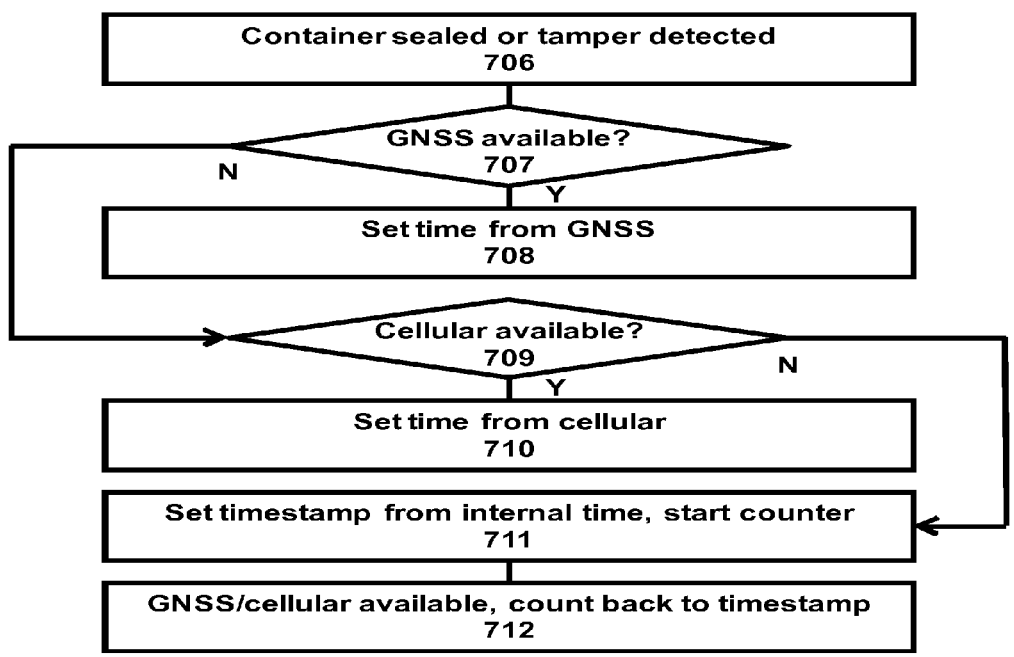

FIGS. 7A and 7B are flow diagrams of the operation across various supply chain conditions of the e-Seal 101. The e-Seal 101 provides a method to reset a security tamper detection over the air through the wireless communications from the server, to enable multi-stop container loading or customs inspections where the party opening the container is a trusted party able to authenticate themselves to the server to generate the over the air tamper reset command to the e-Seal 101.

Referring to FIG. 7A, in some implementations the container is initially sealed and the e-Seal 101 secured (700). Upon a subsequent need to open the container prior to the destination, the authorized party authenticates themselves to the server (701). The e-Seal 101 can then be removed and the container opened (702). The e-Seal 101 will report a tamper to the server (703), and due to the authentication of the authorized party the server sends a tamper reset command over the air (704). The container can then be closed and the e-Seal 101 secured to continue monitoring of the remainder of the shipment (705).

Referring to FIG. 7B, in some implementations the e-Seal 101 provides a method to obtain the current date and time from the wireless communications networks, as an alternative to time from GNSS, for indoor or blockage cases in which the container and e-Seal 101 may be out of coverage of GNSS satellites. The e-Seal 101 provides a method when detecting a security tamper out of coverage of GNSS or wireless communications, to count time intervals using the e-Seal internal clock, then when later arriving in GNSS or wireless coverage to obtain the current date and time, and count backwards to arrive at an accurate time stamp of the security tamper for reporting to the server. When an event requiring a timestamp occurs, such as the container is sealed or a tamper is detected (706), the availability of GNSS coverage is tested (707). If GNSS is available then accurate time can be recorded from GNSS (708). If GNSS is not available, then cellular coverage is tested (709). If cellular coverage is available then accurate time can be recorded from the cellular infrastructure (710). If neither GNSS nor cellular coverage are available, then a temporary timestamp is recorded based upon the e-Seal internal clock, and a counter is started (711). When the e-Seal 101 reaches either GNSS or cellular coverage, then the time can be measured, and counted backwards using the counter to arrive at an accurate timestamp replacing the temporary timestamp (712).

e-Seal Low Cost Manufacture

Figure 8:
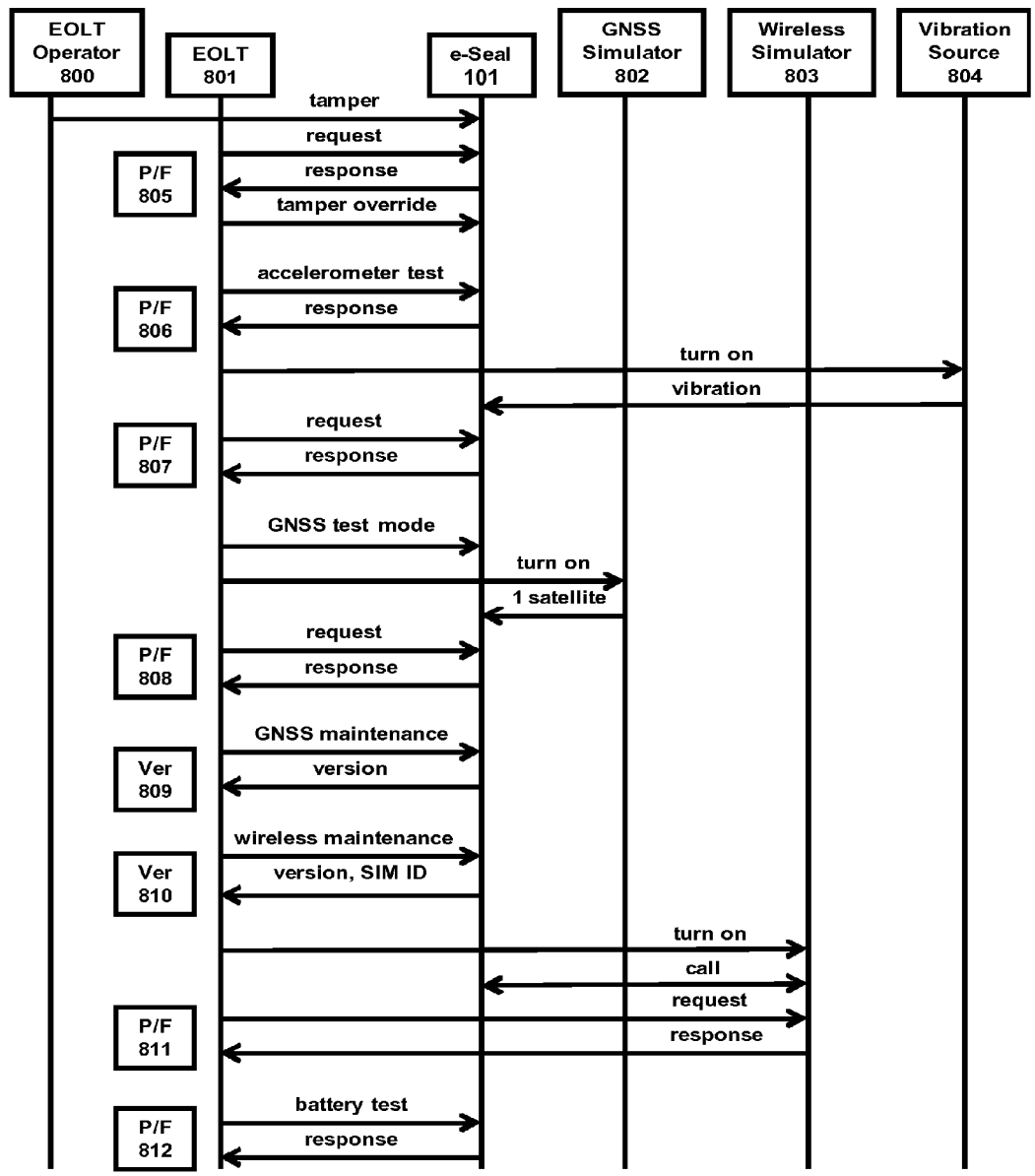
FIG. 8 is an event diagram of the features allowing low cost manufacturing of the e-Seal of FIG. 1.

FIG. 8 is an event diagram of the features allowing low cost manufacturing of the e-Seal 101. In some implementations, this can be accomplished by automating an End Of Line Test (EOLT). Automation speeds the execution time of this test, reduces labor costs for this test, and reduces manual entry errors for this test. The EOLT operator 800 issues a command to the automated EOLT tester 801 to test a newly manufactured e-Seal 101. The EOLT operator 800 operates the e-Seal to cause a security tamper, in a realistic manner the same way as customers would operate the e-Seal 101, for purposes of testing the security mechanism 303. The EOLT 801 requests status from the e-Seal 101 which responds with the tamper status to the EOLT 801. This supports a pass/fail determination 805 of the correct assembly and functioning of the security mechanism. The EOLT then issues a tamper override reset command to the e-Seal 101 to continue the test.

The EOLT 801 issues an accelerometer self test command to the e-Seal 101, which responds to support a pass/fail determination 806 of the correct assembly and functioning of the accelerometer. The EOLT 801 turns on a vibration source 804, issues a vibration sensor self test command to the e-Seal 101, which responds to support a pass/fail determination 807 of the correct assembly and functioning of the vibration sensor. The EOLT 801 commands the e-Seal 101 into GNSS test mode, in which the e-Seal 101 can receive just one satellite signal without requiring the full number of satellites to make a navigation fix. The EOLT 801 turns on the GNSS simulator 802 which is a low cost single channel unit, transmitting a single GNSS channel. The EOLT 801 requests GNSS status from the e-Seal 101, which responds to support a pass/fail determination 808 of the correct assembly and functioning of the GNSS module. The EOLT 801 then issues a GNSS maintenance command to the e-Seal 101, which responds with the GNSS module version information 809, so that the EOLT 801 can record this version information in the manufacturing record for this serial number e-Seal 101.

The EOLT 801 issues a wireless maintenance command to the e-Seal 101, which responds with the wireless module version information 810, so that the EOLT 801 can record this version information in the manufacturing record for this serial number e-Seal 101. The EOLT turns on the wireless simulator 803, which places a call to the e-Seal 101, and when the e-Seal 101 responds then the wireless simulator 803 can measure the wireless signal strength from the e-Seal 101. The wireless simulator 803 responds with the measured signal strength to support a pass/fail determination 811 of the correct assembly and functioning of the wireless module. The EOLT 801 requests battery status from the battery fuel gauge, which responds with the measured battery parameters to support a pass/fail determination 812 of the correct assembly and functioning of the battery fuel gauge, as well as the battery pack in the e-Seal 101.

e-Seal Low Cost Operation

Figure 9:
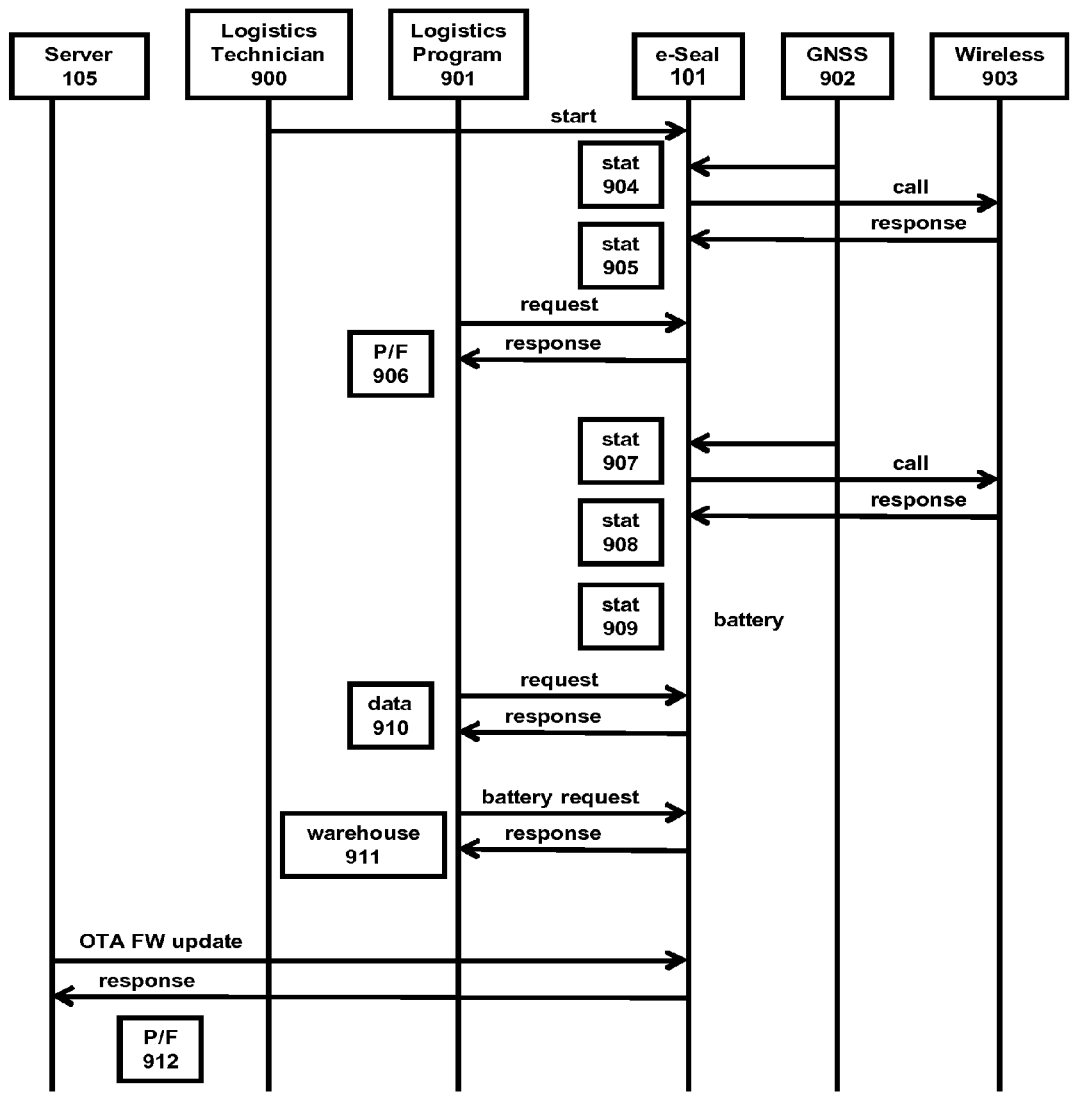
FIG. 9 is an event diagram of the features supporting low cost logistics and operation of the e-Seal of FIG. 1.

FIG. 9 is a diagram of the features supporting low cost logistics and operation of the e-Seal 101. In some implementations, this can be accomplished by automating logistics tests, both for newly received e-Seals from manufacturers, as well as e-Seals returned from customer shipments. Automation speeds the execution time of this test, reduces labor costs for this test, and reduces manual entry errors for this test. Low cost logistics is also supported by the automated test features used during manufacturing, as discussed regarding FIG. 8. Low cost is further supported by maintaining data and statistics history during operation of the e-Seal 101 on a container shipment, so that this history data can be read and stored when the e-Seal 101 is returned from that shipment. This e-Seal history data supports trend tracking and lowered lifecycle costs of e-Seal product improvements.

The logistics technician 900 can test the e-Seal 101 by starting it, in a realistic manner the same way as a customer would start the e-Seal 101. The e-Seal 101 is allowed to run for a test period. The e-Seal 101 receives satellite navigation signals from the GNSS constellations 902, records fixes, and measures statistics of successful fixes 904. The e-Seal 101 makes wireless reports to the wireless infrastructure 903, and measures statistics of successful calls 905. At the conclusion of the test period, the logistics test program 901 requests the GNSS statistics 904 and wireless statistics 905 from the e-Seal 101, which responds to support a pass/fail determination 906 of the correct functioning of the main e-Seal functions.

During customer usage of an e-Seal 101 to track and monitor a container shipment, the e-Seal 101 maintains performance statistics in a history file. These statistics include GNSS 902 fixes 907, wireless infrastructure 903 calls 908, and battery level and voltage 909. When an e-Seal is returned from a customer shipment destination, the logistics program can request this history file in a history report, and store this data 910 for the purpose of trend tracking for that e-Seal 101 serial number and product improvement for that model of e-Seal 101.

Shipping of e-Seals to customers may require temporary warehouse storage following peak shipping periods. The logistics program can issue a command to the e-Seal 101 to reduce the battery charge to a programmable capacity percentage, to extend the lifetime of rechargeable batteries by storing them in a warehouse 911 at an optimum charge capacity.

The e-Seal 101 supports a firmware update over local serial port from the logistics program. For e-Seals which may be in remote customer locations and require a firmware update, the e-Seal 101 supports over the air update of firmware over wireless communications. The server 105 may send a command and protocol to perform over the air wireless update of firmware for e-Seals 100 at remote customer locations, confirming successful update 912, so that firmware updates can be made without having to ship the e-Seal 101 back to logistics refurbishment facilities.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An electronic seal, comprising:
   a security mechanism configured for attaching to a physical asset;
   a battery fuel gauge configured to monitor a capacity of a battery of the electronic seal;
   a navigation system configured to determine a location fix for the electronic seal according to a time interval;
   a processor coupled to the battery fuel gauge and the navigation system, the processor configured to determine if the batter capacity detected by the battery fuel gauge is below a threshold value and to adjust the location fix time interval when the battery capacity is below the threshold value and
   the processor having a security interface coupled to the security mechanism, the processor configured for detecting a security event associated with the electronic seal or the physical asset, and for generating a security status in response to the detecting.

2. The electronic seal of claim 1, where the security mechanism is a bolt seal.

3. The electronic seal of claim 1, where the security mechanism is an indicative seal.

4. The electronic seal of claim 1, where the security mechanism is a cable seal.

5. The electronic seal of claim 1, further comprising:
   an environmental interface coupled to the processor and to a number of environmental sensors for monitoring status of goods inside the physical asset.

6. The electronic seal of claim 1, further comprising:
   a wireless communication system coupled to the processor and configured for sending the status over a wireless communication channel to a service provider according to a status time interval, where the processor is configured to adjust the status time interval when the battery capacity is below the threshold value.

7. The electronic seal of claim 1, further comprising:
a power interface coupled to the processor and to a power source for powering the electronic seal.

8. The electronic seal of claim 1, further comprising:
a serial interface coupled to the processor and configured for updating of parameters of the electronic seal.

9. The electronic seal of claim 1, further comprising:
a memory coupled to the processor for storage of parameters and queued location fixes for reporting.

10. The electronic seal of claim 1, further comprising:
a housing integrated with, or coupled to, the security mechanism, and including a security compartment including circuitry for detecting a security event, and an electronics compartment for storing the processor and wireless communications system, the housing including a window for displaying a status indication provided by one or more light sources.

* * * * *